United States Patent
Kharkar et al.

(10) Patent No.: US 10,668,384 B2
(45) Date of Patent: Jun. 2, 2020

(54) SYSTEM USING RULE BASED TECHNIQUES FOR HANDLING GAMEPLAY RESTRICTIONS

(71) Applicant: Disney Enterprises, Inc., Burbank, CA (US)

(72) Inventors: Sandeep V. Kharkar, Bountiful, UT (US); Christopher H. Stewart, Salt Lake City, UT (US); Bradley A. Edwards, South Jordan, UT (US); Mark Snow, Bountiful, UT (US); Jaren J. Peterson, Layton, UT (US); C. Matthew Dawson, Highland, UT (US); Jon Matsukawa, Salt Lake City, UT (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 1009 days.

(21) Appl. No.: 14/198,513

(22) Filed: Mar. 5, 2014

(65) Prior Publication Data
US 2015/0050996 A1    Feb. 19, 2015

Related U.S. Application Data (60) Provisional application No. 61/866,952, filed on Aug. 16, 2013.

(51) Int. Cl.
*A63F 13/75* (2014.01)
*A63F 13/355* (2014.01)
*A63F 13/63* (2014.01)

(52) U.S. Cl.
CPC .......... *A63F 13/75* (2014.09); *A63F 13/355* (2014.09); *A63F 13/63* (2014.09)

(58) Field of Classification Search
CPC .......... A63F 13/63; A63F 13/75; A63F 13/355
USPC .......................................................... 463/31
See application file for complete search history.

(56) References Cited

U.S. PATENT DOCUMENTS

| | | | | |
|---|---|---|---|---|
| 2008/0004093 A1* | 1/2008 | Van Luchene | .......... | G07F 17/32 463/1 |
| 2009/0124374 A1* | 5/2009 | Patel | .......... | G07F 17/32 463/29 |
| 2009/0307226 A1* | 12/2009 | Koster | .......... | A63F 13/12 |

(Continued)

*Primary Examiner* — Jay Trent Liddle
*Assistant Examiner* — Ryan Hsu
(74) *Attorney, Agent, or Firm* — Esplin & Associates, P.C.

(57) ABSTRACT

Systems and methods employing rule based techniques for handling virtual entity manifestation into gameplay modes in accordance with gameplay restrictions of the individual gameplay modes. The system may comprise a host server including one or more processors configured to execute computer program modules. The computer program modules may comprise a game module configured to execute an instance of the online game and to facilitate participation in one or more gameplay modes, a rule module configured to maintain rules corresponding to the restrictions for manifesting virtual entities into the individual gameplay modes, a creation module configured to create manifests including information corresponding to the rules for each gameplay mode, a determination module configured to determine which rules to apply to the virtual entities, and an application module configured to apply the rules according to the determinations.

18 Claims, 3 Drawing Sheets

(56) References Cited

U.S. PATENT DOCUMENTS

| | | | |
|---|---|---|---|
| 2012/0129584 A1* | 5/2012 | Haslam | A63F 13/63 463/1 |
| 2012/0142429 A1* | 6/2012 | Muller | A63F 13/35 463/42 |
| 2014/0080601 A1* | 3/2014 | Knutsson | A63F 13/12 463/31 |

* cited by examiner

SYSTEM USING RULE BASED TECHNIQUES FOR HANDLING GAMEPLAY RESTRICTIONS

FIELD OF THE DISCLOSURE

This disclosure relates to systems and methods for handling virtual entity manifestation into gameplay modes of an online game, and more particularly to systems and methods employing rule based techniques for handling virtual entity manifestation into gameplay modes in accordance with gameplay restrictions associated with the individual gameplay modes.

BACKGROUND

Online games may include one or more gameplay modes which are available to be played. Gameplay modes may include, for example, co-play and/or multi-player games (e.g., gameplay with other players), solo campaigns (e.g., solo gameplay), gameplay taking place in a given time era, car racing games, mini-games, bonus games, trial games, online gameplay, offline gameplay, and/or other gameplay modes of an online game. Within each gameplay mode, virtual entities such as virtual player characters, virtual objects, and/or virtual items may be subject to different restrictions related to how the virtual entity is manifested into the gameplay mode.

SUMMARY

One aspect of the disclosure relates to an online gaming system employing rule based techniques for handling virtual entity manifestation into gameplay modes of an online game in accordance with gameplay restrictions. The system may comprise one or more processors configured to execute computer program modules and/or other components. The computer program modules may comprise a game module, a rule module, a creation module, a determination module, an application module, and/or other modules.

The game module may be configured to execute an instance of the online game, and to implement the instance of the online game to facilitate participation of users in one or more gameplay modes of the online game on user devices. The one or more gameplay modes may include a first gameplay mode of the online game.

The rule module may be configured to maintain rules corresponding to gameplay restrictions for manifesting virtual entities into the gameplay modes of the instance of the online game. One or more of the maintained rules may correspond with at least one of the individual gameplay modes. The rules may comprise rule criteria which must be satisfied in order to apply restrictions of the rules to the virtual entities. In some implementations, the rule module may be configured to maintain a first rule and a second rule corresponding to gameplay restrictions for the gameplay modes of the instance of the online game such that at least one of the rules, for example the second rule, corresponds to the first gameplay mode.

The creation module may be configured to create manifests. The manifest may include information corresponding to the rules for manifesting virtual entities into the individual gameplay modes of the online game. The creation module may be configured to create a first manifest including information corresponding to rules for manifesting virtual entities into the first gameplay mode of the online game. The first manifest may include information corresponding to at least one of the rules, for example the second rule.

The determination module may be configured to determine which rules to apply to virtual entities. The determination module may be configured to determine, from the information corresponding to the rules included in the manifest for an individual gameplay mode, one or more of the rules having criteria which are satisfied by the attributes of one or more virtual entities to be manifested into an individual gameplay mode. For example, the determination module may be configured to determine from the information corresponding to the rules included in the first manifest, that the second rule has criteria which are satisfied by the attributes of a first virtual entity.

The application module may be configured to apply restrictions of the rules to virtual entities such that the virtual entities can be manifested into a gameplay mode. The application module may be configured such that responsive to the determination by the determination module of one or more rules having criteria which are satisfied by the one or more virtual entities to be manifested into an individual gameplay mode, to apply restrictions of the one or more rule to the virtual entities. For example, the application module may be configured to, responsive to the determination that the second rule has criteria satisfied by the first virtual entity, apply the restrictions of the second rule to the first virtual entity for manifesting the first virtual entity into the first gameplay mode.

Another aspect of the disclosure relates to a method for employing rule based techniques for handling virtual entity manifestation into gameplay modes of an online game in accordance with gameplay restrictions. The method may be implemented on a computer system that includes one or more physical processors and storage media storing machine-readable instructions. The method may comprise the operations of: executing an instance of the online game, maintaining rules corresponding to gameplay restrictions for manifesting virtual entities into gameplay modes of the online game, creating manifests including information corresponding to the rules for manifesting virtual entities into the individual gameplay modes, determining rules to apply to the virtual entities, applying the restrictions of the determined rules to the virtual entities, and/or other operations.

Executing an instance of the online game may include implementing the instance of the online game to facilitate participation of users in one or more gameplay modes of the online game on user devices. The gameplay modes may include a first gameplay mode.

Maintaining rules corresponding to gameplay restrictions for manifesting virtual entities into the gameplay modes of the instance of the online game may include maintaining rules which correspond with at least one of the individual gameplay modes. Rules may comprise rule criteria which must be satisfied in order to apply the restrictions of the rules to the virtual entities. Maintaining rules may include maintaining a first rule and a second rule corresponding to gameplay restrictions for the gameplay modes of the instance of the online game, such that at least one rule, for example the second rule, corresponds to the first gameplay mode.

Creating manifests including information corresponding to the rules for manifesting virtual entities into the individual gameplay modes of the online game may include creating a first manifest including information corresponding to rules for manifesting virtual entities into the first gameplay mode of the online game. The first manifest may include information corresponding to at least one of the rules, for example the second rule.

Determining rules to apply to virtual entities may include determining from the information corresponding to the rules included in the manifest for an individual gameplay mode, one or more rules having criteria which are satisfied by the attributes of one or more virtual entities to be manifested into the gameplay mode. Determining rules may include determining from the information corresponding to the one or more rules included in the first manifest, that the second rule has criteria which are satisfied by the attributes of a first virtual entity.

Applying the restrictions of the rules to virtual entities such that the virtual entities can be manifested into the gameplay mode may include, responsive to the determination of the one or more rules having criteria which are satisfied by the one or more virtual entities to be manifested into an individual gameplay mode, applying restrictions of the one or more rules to the virtual entities having attributes which satisfy the criteria of the one or more determined rules. In some implementations, applying rules may include, responsive to the determination that the second rule has criteria satisfied by the first virtual entity, applying the restrictions of the second rule to the first virtual entity.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
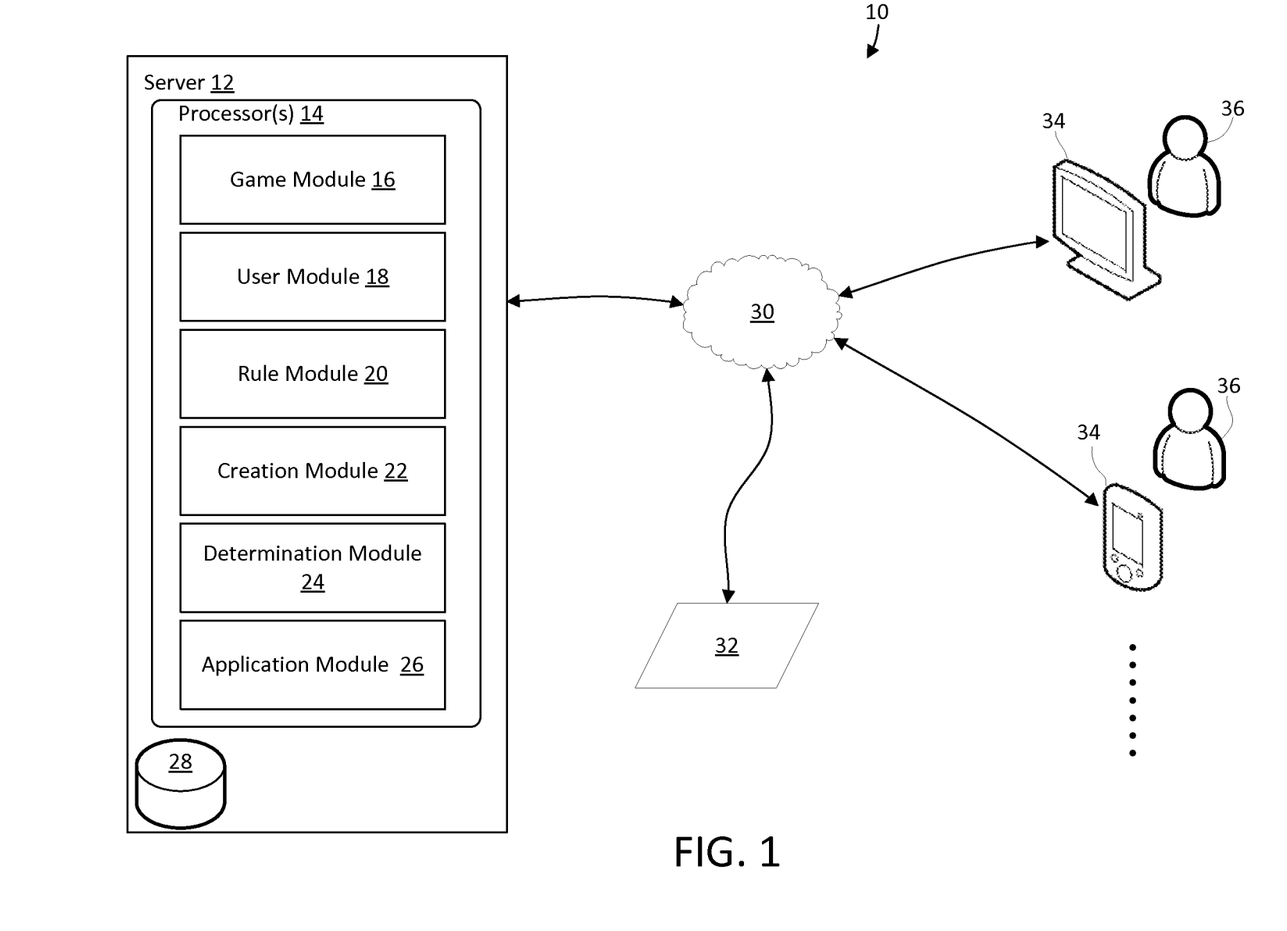
FIG. 1 illustrates a system employing rule based techniques for handling virtual entity manifestation into gameplay modes of an online game in accordance with gameplay restrictions.

FIG. 1 illustrates a system 10 providing rule based techniques for handling virtual entity manifestation into virtual environment in accordance with restrictions associated with individual modes of the virtual environment. The virtual environment may include, for example, an online game. The modes of the online game may include, for example, different gameplay modes of the online game. Users 36 of the system 10 may access the online game and/or one or more gameplay modes of the online game via user devices 34. User devices 34 may include one or more of a cellular telephone, a smartphone, a laptop, a tablet computer, a desktop computer, a television set-top box, smart TV, a gaming console, and/or other device suitably configured to carry out the various aspects of the system 10 described herein.

Gameplay modes may be different implementations of an instance of the online game. Gameplay modes may differ in a variety of ways. For example, differences may include restrictions related to the virtual entities which are presented and/or available for use by player characters within the game, how the virtual entities manifest into the gameplay mode, one or more different objectives and/or goals related to gameplay, variations in topography and/or views of the online game, variations in the starting position of virtual entities when the game is initiated and/or when an entity reenters the game, and/or other restrictions. Examples of different gameplay modes may include, for example, co-play and/or multi-player games (e.g., gameplay with other players), solo campaigns (e.g., solo gameplay), gameplay taking place in a given time era, gameplay taking place with characters in virtual vehicles (e.g., car racing game), gameplay taking place with characters on foot, mini-games, bonus games, trial games, online gameplay, offline gameplay, and/or other gameplay modes. Other restrictions related to gameplay modes are also described herein.

Virtual entities may refer to virtual entities of one or more entity types. Entity types may include one or more of virtual characters, virtual objects, virtual items, and/or other entity types. Virtual entities of the character type may correspond to the representation of the virtual characters associated with the users 36 of the system 10. For example, virtual character types may include fantasy characters (e.g., an alien), human-like characters (e.g., a pirate), animal characters (e.g., a bear), machine-like characters (e.g., a virtual car), and/or other consideration of an entity of the character type. Virtual entities of the object types may include virtual vehicles, buildings, topographical elements, and/or other considerations of objects which a player can view and/or interact with during gameplay. Virtual entities of the item type may refer to virtual items which are available for use by the virtual player characters associated with the users 36 of the system 10 during gameplay. Virtual items may include one or more of weapons, tools, health, power-ups, vehicles, and/or other virtual items.

Restrictions related to the virtual entities which are available for use by player characters within the game may refer to virtual items and/or virtual objects which the player characters can use and/or interact with during gameplay. Use of items and/or objects may refer to the possession of the items by the user characters when a player is manifested (e.g., made available within the user characters virtual inventory), items which are available to be acquired during gameplay, interaction of objects by a character (e.g., the vehicles which a character can enter and use to drive around), and/or other considerations. As an illustrative example, a given gameplay mode may define and/or restrict the types of weapons and/or vehicles the player characters can use. Expanding on this example, a Civil War-era multi-player gameplay mode may restrict gameplay to the manifestation of weapons and/or vehicles which depict the types of weapons and vehicles that were available during the Civil War-era (e.g., a spaceship may not be made available to the players). As another example, a car race gameplay mode may restrict gameplay such that all player characters must be in a virtual car (or be of the car type player character). Other restrictions related to virtual entities available to the player characters during gameplay are also contemplated.

Restrictions related to the virtual entities which are presented to the users 36 in the virtual environment may refer to virtual objects and/or items which are placed within the topography of the virtual environment. Objects may refer to objects which are stationary and/or movable within the topography. For example, within the virtual environment topography, there may be buildings, plants, and/or other topographical elements which are manifested and presented within views of the online game. The individual gameplay modes may differ in the type, placement, level of interaction, color, size, shape, topography, and/or other features of the virtual objects presented in the given gameplay mode. For example, in a given gameplay mode, a user character may be able to enter a building, while in another gameplay mode, the user may not. Other restrictions related to the virtual entities which are presented to the users 36 on user devices 34 are also contemplated.

Restrictions related to how virtual entities manifest may be considered in a variety of ways. The manner in which virtual objects and/or items manifest may refer to manifestation when gameplay is initiated (e.g., spawning) by the users 36 and/or when an entity spawns into gameplay after character death. Initial manifestation of virtual objects and/or items may include placement restrictions, quantity restrictions, and/or other considerations of restrictions relating to objects and/or items when a player starts a gameplay mode. For example, certain objects and/or items may manifest near the spawning area of the characters (e.g., for quick access by the users 36 when a game is initiated), may manifest in areas more difficult for users 36 to find, placed in random areas, and/or other considerations. Continuing in this example, in a combat style gameplay mode, a basic weapon (e.g., a knife) may manifest near where the player characters manifest within the game, and/or a powerful weapon (e.g., a sniper rifle) may manifest at a location far from the character spawn location (e.g., making it difficult for the characters to obtain). As another example, in a car race type gameplay mode, player characters may spawn in a virtual car (e.g., at a starting line or other location), or the player character must be of the car type player character in order to participate in the car race.

For character spawning considerations, objects and/or items which the users are in possession of may manifest in a variety of ways. In some gameplay modes, objects and/or items acquired by the user prior to death (e.g., a vehicle driven by the character and/or an inventory of weapons acquired by the character prior to death), may re-manifest into the game at the same locations where the items/objects initially manifested in the game, may remain at the location where the user died, may remain in the users virtual inventory, and/or other considerations for re-manifestation of objects/items when a character dies and thereafter reenters the gameplay mode.

Restrictions related to the manifestation (e.g., starting position, starting virtual items/vehicles) of player characters when gameplay is initiated and/or when a player reenters the game after death may differ by gameplay modes. For example, in a multi-player gameplay mode, player characters on the same team may manifest and/or spawn into the online game at a similar starting location (e.g., at a team "home base" and/or other location). As another example, in a solo-campaign type gameplay mode, a player character may manifest into the game at a location corresponding to the last checkpoint (e.g., a saved location) achieved during previous gameplay, and/or the player character may continue to spawn at the last checkpoint until a next checkpoint is reached. In a vehicle race type gameplay mode, the player character may be required to spawn in a vehicle at a starting line. Other restrictions related to character starting position are contemplated.

Cinematic effects may also be considered when a player is manifested into a starting position. For example, cinematic effects may include fading into the views of the online game from a black screen, presenting views of other players currently in the gameplay mode prior to presenting views of the player character spawning into the starting position, and/or other cinematic considerations.

Restrictions related the frequency and/or timing at which the virtual entities are manifested may also be considered. For example, after character death, the user may have to wait a certain time until they can spawn back into the game. The player characters may be subject to a maximum amount of spawning for certain gameplay modes. For example, a "sudden death" type multi-player gameplay mode may not allow characters to spawn after the first death after initiation of the gameplay mode. Frequency and/or timing consideration may also be considered for the manifestation of virtual objects and/or items (e.g., a building may be blown up, however may be manifested back into the game after a time period). Other restrictions related to frequency and/or timing of virtual entity manifestation are also contemplated.

When a virtual entity is manifested into the various gameplay modes of the online game (either during initial gameplay or spawn after death), the associated restrictions as outlined above may be implemented as one or more rules including information corresponding to the gameplay restrictions which are to be applied to the virtual entities. Rules may include information such as criteria which must be met so as the rule restrictions can be applied, and/or other information. Information related to the rules may be referred to as rule data. Criteria requirements may correspond to certain attributes of the virtual entities which must be met in order to satisfy the criteria and apply the rule. Attributes of a virtual entity may include, for example, the virtual entity type and/or other attribute considerations. For example, in a car race type gameplay mode, if a player character is of the vehicle type character, then this attribute would allow the character to spawn directly into the gameplay mode without having to also manifest a virtual vehicle for the character during the spawn. However if the character is a bi-pedal character, then a rule would require a vehicle to be manifested along with character manifestation in order to play the care race type gameplay mode.

When a virtual entity to be manifested into a gameplay mode meets the criteria of one or more rules (e.g., preparation phase), instances of the one or more rules may be applied (e.g., application phase) to the entity and the entity may be manifested into the online game accordingly. Rule instances are described in more detail shortly below.

In some implementations of the present invention, the application of gameplay rules for the individual gameplay modes is accomplished via the creation and/or implementation of one or more gameplay manifests. The manifests for the gameplay modes may include the information (e.g., rule data) corresponding to some or all of the rules associated with the restrictions of the given gameplay mode. Virtual entities may have attributes (e.g., being of a virtual entity type). Virtual entities may "enter" the manifest so that appropriate rules can be determined and applied before being manifested into the gameplay mode. Using the known attributes of the virtual entities, the system 10 may then determine the one or more rules which have criteria met by the entity-specific attributes, and then apply the rules so that the entity can be manifested into the game accordingly.

The manifests for a gameplay mode may include a list of the rule data corresponding to the rules of the gameplay mode. Rule data may include information about the restrictions related to the rule. Rule data may include information about the criteria related to the rule. Rule data may include information which describes the virtual entities associated with the rule, the locations of manifestation of the virtual entities associated with the rule, and/or other information associated with the rule. For example, data for a "Rule 1" for a car race gameplay mode may include "Rule 1—Criteria: Virtual entity being a vehicle character of the character type" and "Rule 1—Restriction: manifest in location X". Data for a "Rule 2" may include "Rule 2—Criteria: Virtual entity being of the human-like character of the character type" and "Rule 2—Restriction: manifest at location Y with item N in their inventory". The above example is provided for illustrative purpose only, while it is contemplated that rule data may be described in other ways and/or with other considerations. For example, in some embodiments, Rule 1 may be interpreted as "if the virtual entity is NOT a vehicle type character, then automatically manifest the character at location X in a virtual vehicle" (e.g., therefore both vehicle and non-vehicle type characters can be manifested into the car race gameplay mode).

Once virtual entities are associated (e.g., by virtue of satisfying rule criteria) with the rules (e.g., rule data) in the preparation phase, specific instances of the rules may be created for application to the virtual entities. The creation of the instances of entity specific rules may provide rules which are in ready state for application to the given entities. The state of the entity specific rules may be maintained until gameplay is ended, such that the rule can be suitably managed as needed, for example, due to reentrancy of the virtual entity. An example of reentrancy is a double death of a virtual character. During gameplay a player character may fall to death (e.g., due to the limited topography of the virtual environment map of the game) and the player character may die from damage. If this occurs at the same time (e.g., the character dies from damage and falls over the edge of the game map at the same time), particular handling may be carried out by the system 10. For example, rules for manifesting the character which are to be applied based on the first instance of the death may be given priority, while the rules for manifesting the character based on the second instance of death may be given less priority (or possibly discarded for redundancy).

The features and functions of the system 10 described herein may be particularly advantageous in an online game where multiple character (and items and objects) reentries are carried out. For example, the system 10 herein may allow for multiple character reentrances (e.g., multiple characters experiencing double death) to be handled efficiently using the features and functions described herein. In particular, the system 10 may be employed to handle multiple character reentrancy by rule priority arbitration and queuing. For example, during the preparation phase (e.g., associating the virtual entity with one or more rules by virtue of rule criteria being satisfied) the system 10 may combine a given virtual entity with any other current virtual entities in the preparation phase, allowing rules with higher priorities to be applied while discarding lower priority rules of the same type (e.g., due to redundancy). This may allow for rapid reentry to be arbitrated early.

In some embodiments, if a virtual entity is ready for the rule application phase, then the system 10 may queue up the virtual entity for rule application and manifestation into the online game. If there are multiple reentries queued up, they may also be arbitrated using rule priority similarly to the arbitration of the preparation phase. This may allow for all queued reentries to be collapsed into a single entry. The queuing may prevent a virtual entity from getting partial, out of order, or incorrect application of manifest rules. The techniques in which virtual entities are associated with rules, and in which the rules are applied, are described in more detail herein.

In FIG. 1, in some implementations, providing the virtual environment may include hosting the virtual environment over a network 30, such as the Internet. A host server may include one or more processors configured to execute one or more computer modules for implementing an instance of an online game and to facilitate the participation of one or more users in the online game. The host server may be a game server 12. The game server 12 may include one or more processors, such as processor 14.

The computer program modules may include one or more of a game module 16, user module 18, rule module 20, creation module 22, determination module 24, application module 26, and/or other modules. The server 12 may be configured to communicate with one or more user devices 34, according to client/server architecture. The users 36 may access system 10 and/or the virtual environment hosted by server 12 via the user devices 34.

The game module 16 may be configured to implement an instance of the virtual environment executed by the computer modules to determine state of the virtual environment. The state may then be communicated (e.g., via streaming visual data, via object/position data, and/or other state information) from server 12 to user devices 34 for presentation to users. The state determined and transmitted to a given user devices 34 may correspond to a view for a user character (e.g., a character associated with a physical object 46) being controlled by a user via input devices (e.g., a controller) at the given user device 34. The state determined and presented to a given user device 34 may correspond to a location in the virtual environment (e.g., location in the game). The view described by the state for the given user device 34 may correspond, for example, to the location from which the view is taken, the location the view depicts, and/or other locations, a zoom ratio, a dimensionality of objects, a point-of-view, and/or view parameters of the view. One or more of the view parameters may be selectable by the user.

An instance of the virtual environment may comprise a simulated environment that is accessible by users via clients (e.g., user devices 34) that present the views of the virtual environment to a user. The simulated environment may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the environment, and/or surface features of a surface or objects that are "native" to the environment. In some instances, the topography may describe a surface (e.g., a ground surface) that runs through at least a substantial portion of the environment. In some instances, the topography may describe a volume with one or more bodies positioned therein (e.g., a simulation of gravity-deprived environment with one or more celestial bodies positioned therein). An instance executed by the computer modules may be synchronous, asynchronous, and/or semi-synchronous. An instance of the online game may comprise one or more gameplay modes available for access (e.g., available to be played) by the users 36 of the system 10. Gameplay modes may refer to gameplay modes as described herein, and/or other considerations.

The above description of the manner in which state of the virtual environments is determined by game module 16 of the server 12 is not intended to be limiting. The game module 16 may be configured to express the virtual environment in a more limited, or more rich, manner. For example, views determined for the virtual environment representing the state of the instance of the virtual environment may be selected from a limited set of graphics depicting an event in a given place within the virtual environment. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual environment are contemplated.

Within the instance(s) of the virtual environment executed by game module 16, users may control characters, objects, simulated physical phenomena (e.g., wind, rain, earthquakes, and/or other phenomena), and/or other elements within the virtual environment to interact with the virtual environment and/or each other. Within the instance(s) of the virtual environment executed by game module 16, users may 'join' and/or play different modes of the online game. Gameplay modes may include gameplay modes as described herein, and/or other considerations. Gameplay modes may comprise gameplay modes facilitated through different instances of the online game executed by the game module 16. For example, referring to FIG. 2, the game module 16 may be configured to execute an instance of the online game including at least a first gameplay mode 38, and/or other gameplay modes.

Returning to FIG. 1, the user characters may include avatars. As used herein, the term "user character" may refer to an object (or group of objects) present in the virtual environment that represents an individual user. The user character may be controlled by the user with which it is associated. The user controlled element(s) may move through and interact with the virtual environment (e.g., non-user characters in the virtual environment, other objects in the virtual environment) and/or various gameplay modes of the online game. The user controlled elements controlled by and/or associated with a given user may be created and/or customized by the given user. The user may have an "inventory" of virtual items and/or currency that the user can use (e.g., by manipulation of a user character or other user controlled element, and/or other items) within the virtual environment. The inventory may vary depending on the gameplay mode being played by the user 36 based on one or more gameplay restrictions associated with the gameplay mode.

The users may participate in the instance of the virtual environment by controlling one or more of the available user controlled elements in the virtual environment. Control may be exercised through control inputs and/or commands input by the users through user devices 34. The users may interact with each other through communications exchanged within the virtual environment. Such communications may include one or more of textual chat, instant messages, private messages, voice communications, and/or other communications. Communications may be received and entered by the users via their respective user devices 34. Communications may be routed to and from the appropriate users through server 12 (e.g., through game module 16).

The instance of the virtual space and/or the online game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other player's inventories, changes experienced by non-player characters, changes to the virtual items available for use in the online game, and/or other changes.

The user module 18 may be configured to access and/or manage one or more user accounts and/or user information associated with users of the system 10. The one or more user accounts and/or user information may include information stored by server 12, one or more of the user devices 34, and/or other storage locations. The user accounts may include, for example, information associated with the users (e.g., a username or handle, a number, an identifier, and/or other identifying information) within the virtual environment, security login information (e.g., a login code or password), virtual space account information, subscription information, virtual currency account information (e.g., related to currency held in credit for a user), relationship information (e.g., information related to relationships between users and user 'friends' in the virtual environment), virtual environment usage information, gameplay mode usage information, demographic information associated with users, interaction history among users in the virtual environment, information stated by users, browsing history of users, a user 36 identification associated with a user, a phone number associated with a user, and/or other information related to users.

The rule module 20 may be configured to maintain rules corresponding to gameplay restrictions for manifesting virtual entities into the gameplay modes of the instance of the online game. The rule module 20 may be configured such that one or more of the rules maintained within the rule module 20 correspond with at least one of the individual gameplay modes available to be played within the instance of the online game. The rules may comprise rule criteria which must be satisfied to apply restrictions of the rules to the virtual entities so that the entities can be appropriately manifested into the given gameplay mode. For example criteria may relate to type of virtual entity, that the player character has one or more virtual items in possession, and/or other features of virtual entities that a virtual entity must possess to satisfy rule criteria.

Figure 2:
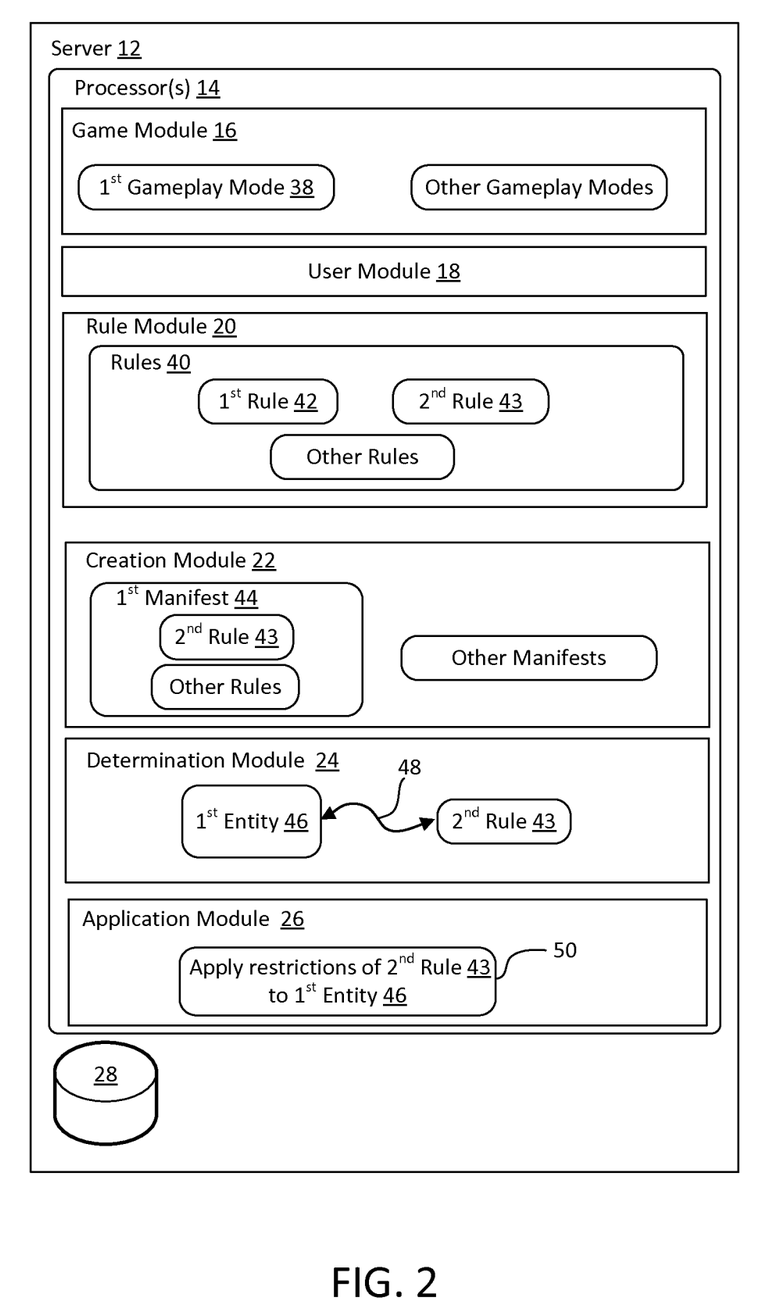
FIG. 2 illustrates in more detail a depiction of a host server used in the system of FIG. 1.

As an illustrative example shown in FIG. 2, the rule module 20 may be configured to maintain a first rule 42, a second rule 43, and/or other rules corresponding to gameplay restrictions for the gameplay modes of the instance of the online game executed by the game module 16. The rule module 20 may be configured such that at least one rule, for example the second rule 43, corresponds to the one or more rules for manifesting virtual entities into the first gameplay mode 38. The first rule 42 and the second rule 43 may have rule data associated therewith. For example the first rule 42 may include first rule criteria and first rule restriction(s), and the second rule 43 may include second rule criteria and second rule restriction(s).

Returning to FIG. 1, the creation module 22 may be configured to create manifests for the gameplay modes of the online game. The creation module 22 may be configured such that the manifests include information corresponding to the rules (e.g., rule data) for manifesting virtual entities into the individual gameplay modes of the online game. In some implementations, the creation module 22 may be configured such that the once manifests are created, they are maintained by the system 10 until the end of game play (e.g., or indefinitely or other time period). This may allow the manifests to be maintained accessible throughout gameplay as needed for entity manifestation. At the end of gameplay, the manifest may be deleted and/or otherwise made inaccessible, such that upon a new instance of gameplay, the creation module 22 may be configured to re-create manifests as needed.

In some implementations, the creation module 22 may be configured such that once manifest are created, the manifest are maintained by the system 10 (e.g., stored in electronic storage 28) after gameplay has ceased (e.g., indefinitely and/or for a time period). This may allow manifests to be readily available during further instances of gameplay by the users 36 without the need to re-create the manifests. Other techniques in which manifests are maintained and/or discarded are also contemplated.

The creation module 22 may be configured such that, by virtue of the determination module 24 determining that one or more rules have criteria satisfied by the entities to be manifested, the creation module 22 may create instances of the rules specific to the virtual entities configured for application to the virtual entities (e.g., by the application module 26). The creation of the instances of entity specific rules may provide rules which are in ready state for application to the entities. The state of the entity specific rules may be maintained until gameplay is ended, such that the rule may be reapplied as needed (e.g., if the virtual entity dies and is manifested back into the gameplay mode, without the need to re-create the rule instance).

As an illustrative example in FIG. 2, the creation module 22 may be configured to create a first manifest 44. The first manifest 44 may include information corresponding to the one or more rules for manifesting virtual entities into the first gameplay mode 38. The creation module 22 may be configured such that the first manifest 44 includes information corresponding to at least one of the rules, for example the second rule 43.

Returning to FIG. 1, the determination module 24 may be configured to determine rules to apply to virtual entities for manifesting the virtual entities into the gameplay modes of the online game. The determination module 24 may be configured to determine, from the information corresponding to the rules included in the manifest for an individual gameplay mode, one or more of the rules having criteria which are satisfied by the attributes of one or more virtual entities to be manifested into the gameplay mode (e.g., the preparation phase). For example information corresponding to rules may indicate that a rule has criteria directed toward human-like characters of the virtual character type. The determination module 24 may be configured such that, by virtue of an entity to be manifested having attributes indicating a human-like character of the virtual character type, to determine from the information corresponding the one or more rules (e.g., rule data) included in the manifest, that the a human-like character of the virtual character type satisfies the criteria of the rule. Rule priority arbitration and queuing may be performed as described herein.

As an illustrative example shown in FIG. 2, the determination module 24 may be configured to determine, from the information corresponding to the one or more rules included in the first manifest 44 (e.g., the rule data for the second rule 43 and/or other rules), that the second rule 43 has criteria which are satisfied 48 by the attributes of a first virtual entity 46. The second rule 43 may then be applied to the first entity 46 for manifesting the first entity 46 into the first gameplay mode 38 (e.g., by the application module 26).

Returning to FIG. 1, the application module 26 may be configured to apply the restrictions of the rules such that the virtual entities can be manifested into the gameplay modes of the online game (e.g., the application phase). The application module 26 may be configured such that, responsive to the determination by the determination module 24 of the one or more rules having criteria which are satisfied by the one or more virtual entities to be manifested into an individual gameplay mode, apply the restrictions of the one or more rules to the respective virtual entities. In some implementations, applying rules includes applying instances of the rules. Instances of the rules may be stored by the system 10 (e.g., rule module 20) and/or instances of the rules may be created by virtue of the virtual entities being associated with the rules (e.g., from the information corresponding to the rules in the manifests, determining that rule criteria is satisfied). In some implementations, the creation module 22 may be configured to, by virtue of the determination module 24 determining the rules which have satisfied criteria, create the instances of the rules so that the application module 26 can apply them accordingly. Rule priority arbitration and queuing may be performed as described herein.

Referring now to the illustrative example of FIG. 2, the application module 26 may be configured such that, responsive to the determination performed by the determination module 24 that the second rule 43 has criteria satisfied 48 by the first virtual entity 46, apply 50 the restrictions of the second rule 43 to the first virtual entity 46. In some implementations, applying the restrictions of the second rule 43 to the first virtual entity 46 may comprises applying the instance of the second rule 43 created by the creation module 22.

Returning to FIG. 1, the server 12, user devices 34, and/or external resources 32 may be operatively linked via one or more electronic communication links. For example, such electronic communication links may be established, at least in part, via a network 30 such as the Internet and/or other networks. It will be appreciated that this is not intended to be limiting, and that the scope of this disclosure includes implementations in which servers 12, user devices 34, and/or external resources 32 may be operatively linked via some other communication media.

The external resources 32 may include sources of information, hosts and/or providers of virtual environments outside of system 10, external entities participating with system 10, and/or other resources. In some implementations, some or all of the functionality attributed herein to external resources 32 may be provided by resources included in system 10.

The server 12 may include electronic storage 28, one or more processors 14, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 28 may comprise electronic storage media that electronically stores information. The electronic storage media of electronic storage 28 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 28 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 28, 34, 52 may include one or more virtual storage resources (e.g., cloud storage, a virtual private network, and/or other virtual storage resources). Electronic storage 28, 34, 52 may store software algorithms, information determined by processor 14, information received from server 12, information received from user devices 34, and/or other information that enables server 12, user devices 34, and physical objects 46 to function as described herein.

Processor(s) 14 may be configured to provide information processing capabilities in server 12. As such, processors 14 may include one or more of a digital processor, an analog processor, a digital circuit designed to process information, an analog circuit designed to process information, a state machine, and/or other mechanisms for electronically processing information. Although processor 14 is shown in FIG. 1 as single entities, this is for illustrative purposes only. In some implementations, processor 14 may include one or more processing units. These processing units may be physically located within the same device, or processor 14 may represent processing functionality of a plurality of devices operating in coordination. The processor 14 may be configured to execute modules 16, 18, 20, 22, 24, and 26. Processor 14 may be configured to execute modules 16, 18, 20, 22, 24, and 26 by software; hardware; firmware; some combination of software, hardware, and/or firmware; and/or other mechanisms for configuring processing capabilities on processor 14.

It should be appreciated that although modules 16, 18, 20, 22, 24, and 26 are illustrated in FIG. 1 as being co-located within the respective single processing units, in implementations in which processor 14 includes multiple processing units, one or more of modules 16, 18, 20, 22, 24, and 26 may be located remotely from the other modules. The description of the functionality provided by the different modules 16, 18, 20, 22, 24, and 26 described above is for illustrative purposes, and is not intended to be limiting, as any of modules 16, 18, 20, 22, 24, and 26 may provide more or less functionality than is described. For example, one or more of modules 16, 18, 20, 22, 24, and 26 may be eliminated, and some or all of its functionality may be provided by other ones of modules 16, 18, 20, 22, 24, 26, and/or other modules.

Figure 3:
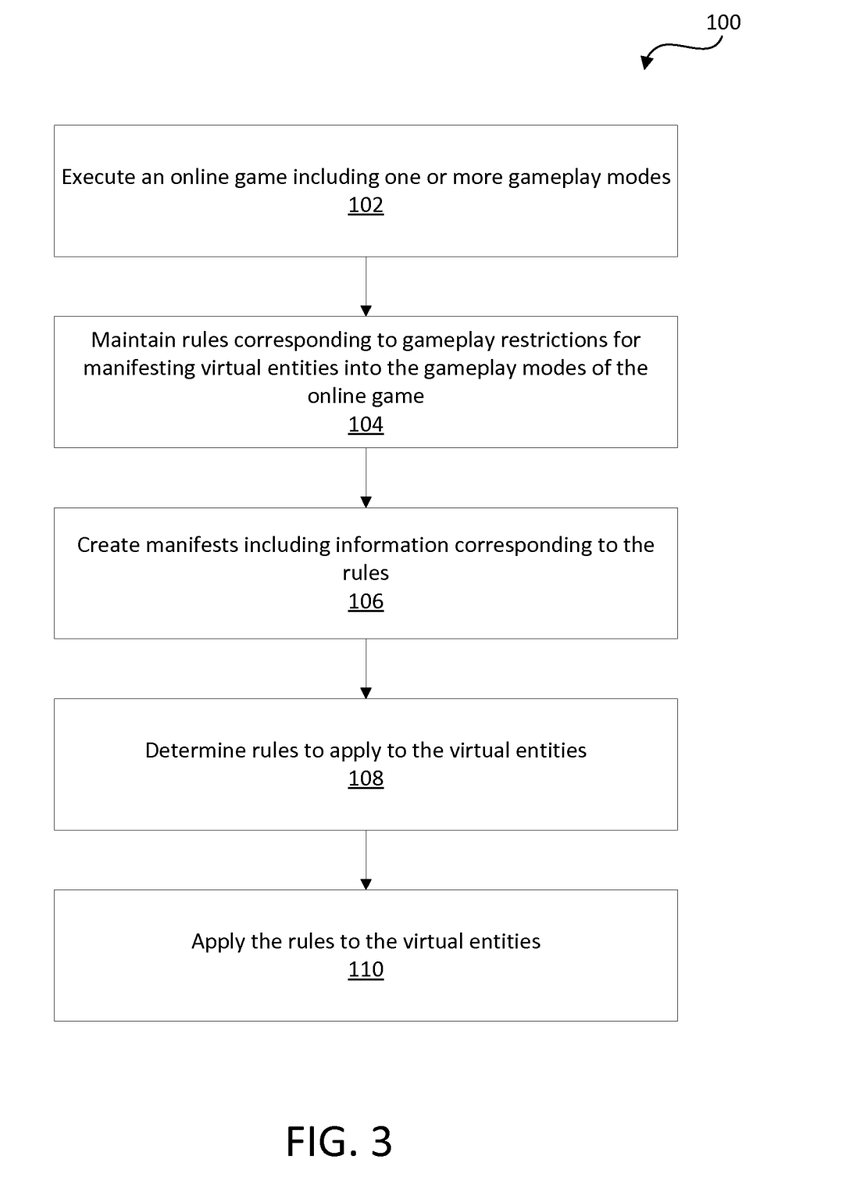
FIG. 3 illustrates a method employing rule based techniques for handling virtual entity manifestation into gameplay modes of an online game in accordance with gameplay restrictions.

FIG. 3 illustrates a method 100 for employing rule based techniques for handling virtual entity manifestation into gameplay modes of an online game in accordance with gameplay restrictions. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 3 and described below are not intended to be limiting.

In some embodiments, method 100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 100 in response to instructions stored electronically on an electronic storage medium. The one or more processing devices may include one or more devices configured through hardware, firmware, and/or software to be specifically designed for execution of one or more of the operations of method 100.

Referring now to method 100 in FIG. 3, at an operation 102 an instance of an online game is executed. The instance of the online game may include one or more gameplay modes. The one or more gameplay modes may include a first gameplay mode. In some implementations, operation 102 may be performed by a game module the same as or similar to game module 16 (shown in FIG. 1 and described herein).

At an operation 104, rules corresponding to gameplay restrictions for manifesting virtual entities into the gameplay modes of the instance of the online game may be maintained. One or more of the rules may correspond with at least one of the gameplay modes of the instance of the online game. The rules may comprise rule criteria which must be satisfied in order to apply restrictions of the rules to the virtual entities to be manifested into a gameplay mode. A first rule and a second rule corresponding to gameplay restrictions for the gameplay modes of the instance of the online game may be maintained. At least the second rule may correspond to the first gameplay mode. In some implementations, operation 104 may be performed by a rule module the same as or similar to the rule module 20 (shown in FIG. 1 and described herein).

At an operation 106, manifests are created. Manifests may include information corresponding to the rules for manifesting virtual entities into the individual gameplay modes of the online game. The manifests may include a first manifest including information corresponding to rules for manifesting virtual entities into the first gameplay mode of the online game. The first manifest may include information corresponding to the second rule. In some implementations, operation 106 may be performed by a creation module the same as or similar to creation module 22 (shown in FIG. 1 and described herein).

At an operation 108, one or more rules to be applied to the virtual entities to be manifested into a gameplay mode are determined. The determination may include including determining from the information corresponding to the rules included in the manifest for an individual gameplay mode, one or more rules having criteria which are satisfied by the attributes of one or more virtual entities to be manifested into the individual gameplay mode. The determination may include determining from the information corresponding to the one or more rules included in the first manifest, that the second rule has criteria which are satisfied by the attributes of a first virtual entity. In some implementations, operation 108 may be performed by a determination module the same as or similar to determination module 24 (shown in FIG. 1 and described herein).

At an operation 110, rule restrictions are applied to virtual entities such that the virtual entities can be manifested into a gameplay mode. The application of restrictions may include, responsive to the determination of the one or more rules having criteria which are satisfied by the one or more virtual entities to be manifested into an individual gameplay mode, applying the restrictions of the one or more rules to the virtual entities having attributes which satisfy the criteria of the one or more rules. Responsive to the determination that the second rule has criteria satisfied by the first virtual entity, the restrictions of the second rule may be applied to the first virtual entity. In some implementations, operation 110 may be performed by an application module the same as or similar to the application module 26 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An online gaming system employing rule based techniques for handling virtual entity instantiation into different gameplay types available in an online game in accordance with gameplay-type restrictions, the system comprising:
   one or more processors configured by machine-readable instructions to:
   execute an instance of the online game, and implement the instance of the online game to facilitate participation of users in the gameplay types available in the online game, the gameplay types available in the online game including two or more of a multi-player type, a solo campaign type, or a car racing game type, such that the gameplay types available in the online game include a first gameplay type;
   maintain rules including instructions for instantiating virtual entities into the individual gameplay types, the virtual entities including one or more of virtual characters controlled by users of the online game, virtual items available for use by the virtual characters, or topographical elements present in a topography of a simulated space of the online game separate from the virtual entities, the topography defining dimensions of the simulated space, the instructions included in the rules corresponding to placement of the individual virtual entities at individual locations within the topography of the simulated space of the online game separate from the virtual entities, one or more of the rules corresponding to at least one of the individual gameplay types, wherein the rules comprise rule criteria which musts be satisfied by attributes of the individual virtual entities in order to apply the instructions of the rules to the individual virtual entitites, the rules including a first rule and a second rule, the second rule corresponding to instructions for instantiating virtual entities into the first gameplay type;
   create and store manifests at the beginning of gameplay in the online game, the manifests including information corresponding to the rules for instantiating virtual entities into the individual gameplay types of the online game, wherein the manifests are deleted from storage at the end of the gameplay in the online game, such that responsive to a start of gameplay in the first gameplay type available in the online game, a first manifest is created and stored, the first manifest including information corresponding to rules for instantiating virtual entities into the first gameplay type of the online game, wherein the first manifest includes at least information corresponding to the second rule;
   determine, from the individual manifests, rules to apply to individual virtual entities based on the individual virtual entities having attributes that satisfy the rule criteria of the rules, such that it is determined to apply the second rule included in the first manifest to a first virtual entity based on the second rule having criteria which are satisfied by attributes of the first virtual entity; and
   execute the instructions of the rules so that the virtual entities are iunstantiated into the individual gameplay types, such that responsive to the determination that the second rule is to be applied to the first virtual entity, execute the instructions of the second rule for the first virtual entity to instantiate the first virtual entity into the first gameplay type in the online game.

2. The system of claim 1 wherein the one or more physical processors are further configured by machine-readable instructions such that:
   by virtue of determining one or more rules having satisfied criteria, create instances of the rules, including by virtue of determining the second rule having satisfied criteria, create an instance of the second rule; and
   wherein executing the instructions of the one or more rules to the virtual entities comprises executing the instructions included in the instance of the one or more rules, such that executing the instructions of the second rule for the first virtual entity comprises executing the instructions included in the instance of the second rule.

3. The system of claim 1 wherein information corresponding to the rules included in the manifests includes at least the criteria of the individual rules and the instructions included in the individual rules.

4. The system of claim 1 wherein the virtual entities include the topographical elements, and wherein the topographical elements include one or both of virtual buildings or virtual vehicles.

5. The system of claim 1 wherein the virtual entities include the virtual items available for use by the virtual characters.

6. The system of claim 1 wherein the instructions included in the rules further correspond to one or both of a type and quantity of virtual items made available to the virtual characters associated with the users of the online game, or the type and quantity of virtual itesm carried by the virtual characters.

7. The system of claim 1 wherein the rule criteria correspond to attributes of virtual entities of different virtual entity types.

8. The system of claim 7 wherein different virtual entities of different virtual entity types comprise one or more of fantasy characters of the character type, human-like characters of the character type, machine-like characters of the character type, weapons of the item type, tools of the item type, vehicles of the object type, buildings of the object type, or topographical element of the object type.

9. The system of claim 1, wherein the different gameplay types further include one or more of a time era-specific type, a mini-game type, a bonus game type, a trial game type, online gameplay type, or offline gameplay type.

10. A method to facilitate online gaming employing rule based techniquest for handling virtual entity instantiation into different gameplay types available in an online game in accordance with gameplay-type restrictions, the method being implemented in a computer system including one or more physical processors and storage media storing machine-readable instructions, the method comprising:

executing an instance of the online game, and implementing the instance of the online game to facilitate participation of users in the gameplay types available in the online game, the gameplay types available in the online game including two or more of a multi-player type, a solo campaign type, or a car racing game type, the gameplay types available in the online game including a first gameplay type;

maintaining rules including instructions for instantiating virtual entities into the individual gameplay types, the virtual entities including one or more of virtual characters controlled by users of the online game, virtual items available for use by the virtual characters, or topographical elements present in a topography of a simulated space of the online game separate from the virtual entities, the topography defining dimensions of the simulated space, the instructions included in the rules corresponding to placement of the individual virtual entities at individual locations within the topography of the simulated space of the online game separate from the virtual entities, wherein the rules comprise rule criteria which must be satisfied by attributes of the individual virtual entities in order to apply the instructcions of the rules to the individual virtual entities, the rules including a first rule and a second rule, the second rule corresponding to instructions for instantiating virtual entities into the first gameplay type;

creating and storing manifests at the beginning of gameplay in the online game, the manifests, the manifest including information corresponding to the rules for instantiating virtual entities into the individual gameplay types of the online game, wherein the manifests are deleted from storage at the end of the gameplay in the online game, such that responsive to a start of gameplay in the first gameplay type available in the online game, including reponsive to a start of gameplay in the first gameplay type available in the online game creating and storing a first manifest, the first manifest including information corresponding to rules for instantiating virtual entities into the first gameplay type of the online game, wherein the first manifest includes at least information corresponding to the second rule;

determining, from the individual manifests, rules to apply to individual virtual entities based on the individual virtual entities having attributes that satisfy the rule criteria of the rules, including determining to apply the second rule included in the first manifest to a first virtual entity based on the second rule having criteria which are satisfied by the attributes of the first virtual entity; and executing the instructions of the rules so that the virtual entities are instantiated into the individual gameplay types, including reponsive to the determination that the second rule is to be applied to the first virtual entity, exectuing the instructions of the second rule for the first virtyal entity to instantiate the first virtual entity into the first gameplay type in the online game.

11. The method of claim 10 additionally comprising:

by virtue of determining one or more rules having satisfied criteria, creating instances of the rules, including by virtue of determining the second rule having satisfied criteria, creating an instance of the second rule; and wherein executing the instructions of the one or more rules to the virtual entities comprises executing the instructions included in the instance of the one or more rules, such that the executing the instructions of the second rule to the first virtual entity comprises executing the instructions included in the instance of the second rule.

12. The method of claim 10 wherein information corresponding to the rules included in the manifests includes at least the criteria of the individual rules and the restrictions included in the individual rules.

13. The method of claim 10 wherein virtual entities include the topographical elements, and wherein the topographical elements include one or both of virtual buildings or virtual vehicles.

14. The method of claim 10 wherein virtual entities include the virtual items available for use by the virtual characters.

15. The method of claim 10 wherein instructions in the rules further correspond to one or both of the type and quality of virtual items made available to the virtual characters associated with the users of the online game, or the type and quality of virtual items carried by the virtual characters.

16. The method of claim 10 wherein rule criteria correspond to attributes of virtual entities of different virtual entity types.

17. The method of claim 16 wherein different virtual entities of different virtual entity types comprise one or more of fantasy characters of the character type, human-like characters of the character type, machine-like characters of the character type, weapons of the item type, tools of the item type, vehicles of the object type, buildings of the object type, or topographical element of the object type.

18. The method of claim 10, wherein the different gameplay types further include one or more of a time era-specific type, a mini-game type, a bonus game type, a trial game type, online gameplay type, or offline gameplay type.

* * * * *

UNITED STATES PATENT AND TRADEMARK OFFICE
CERTIFICATE OF CORRECTION

PATENT NO. : 10,668,384 B2
APPLICATION NO. : 14/198513
DATED : June 2, 2020
INVENTOR(S) : Kharkar et al.

Page 1 of 2

It is certified that error appears in the above-identified patent and that said Letters Patent is hereby corrected as shown below:

In the Claims

In Claim 1, Column 15, Line 25, please delete "one or more processors" and insert --one or more physical processors--, therefor.

In Claim 1, Column 15, Line 50, please delete "musts" and insert --must--, therefor.

In Claim 1, Column 15, Line 53, please delete "entitites" and insert --entities--, therefor.

In Claim 1, Column 16, Line 13, please delete "iunstantiated" and insert --instantiated--, therefor.

In Claim 6, Column 16, Line 47, please delete "itesm" and insert --items--, therefor.

In Claim 8, Column 16, Line 56, please delete "weapones" and insert --weapons--, therefor.

In Claim 10, Column 16, Line 64, please delete "techniquest" and insert --techniques--, therefor.

In Claim 10, Column 17, Line 26, please delete "instructcions" and insert --instructions--, therefor.

In Claim 10, Column 17, Line 38, please delete "reponsive" and insert --responsive--, therefor.

In Claim 10, Column 17, Line 51, please delete "by the attributes" and insert --by attributes--, therefor.

In Claim 10, Column 18, Line 3, please delete "reponsive" and insert --responsive--, therefor.

In Claim 10, Column 18, Line 5, please delete "exectuing" and insert --executing--, therefor.

In Claim 10, Column 18, Line 6, please delete "virtyal" and insert --virtual--, therefor.

In Claim 11, Column 18, Line 8, please delete "additionally" and insert --further--, therefor.

Signed and Sealed this
Twentieth Day of October, 2020

Andrei Iancu
*Director of the United States Patent and Trademark Office*

CERTIFICATE OF CORRECTION (continued)
U.S. Pat. No. 10,668,384 B2

In Claim 11, Column 18, Lines 16-17, please delete "that the executing the instructions of the second rule to the first" and insert --that executing the instructions of the second rule for the first--, therefor.

In Claim 12, Column 18, Line 22, please delete "restrictions" and insert --instructions--, therefor.

In Claim 13, Column 18, Line 24, please delete "wherein virtual entities" and insert --wherein the virtual entities--, therefor.

In Claim 14, Column 18, Line 28, please delete "wherein virtual entities" and insert --wherein the virtual entities--, therefor.

In Claim 15, Column 18, Line 31, please delete "wherein instructions in" and insert --wherein instructions included in--, therefor.

In Claim 15, Column 18, Lines 32-33, please delete "one or both of the type and quality" and insert --one or both of a type and quantity--, therefor.

In Claim 15, Column 18, Lines 35, please delete "quality" and insert --quantity--, therefor.